A. O. BROCK.
SHOCK ABSORBER.
APPLICATION FILED FEB. 14, 1914.
1,151,858.   Patented Aug. 31, 1915.
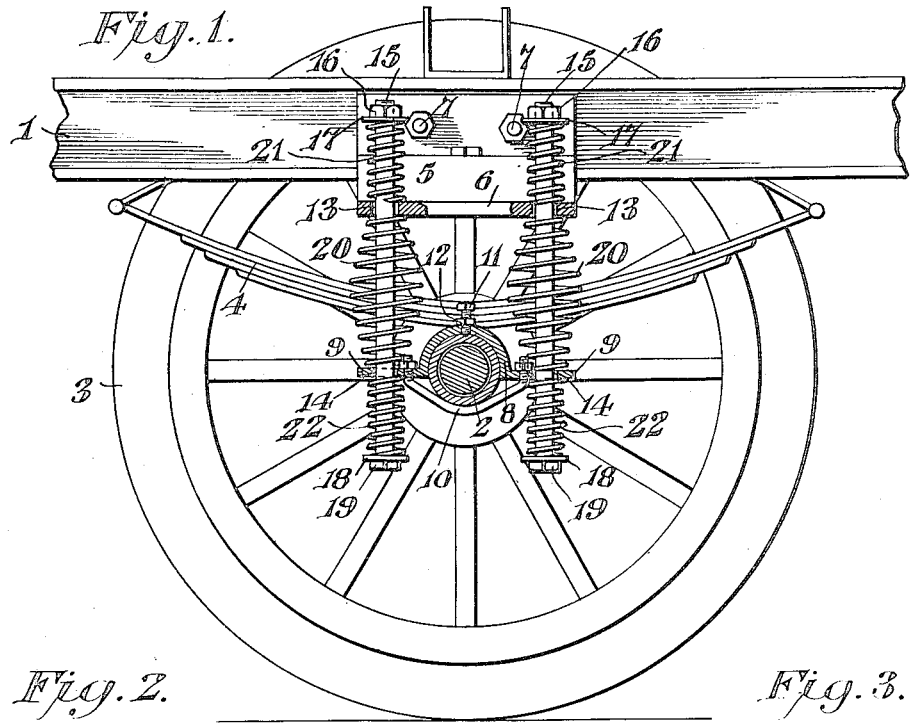
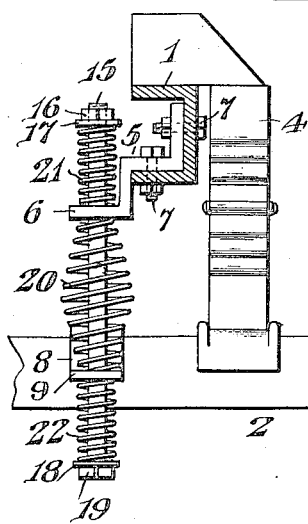
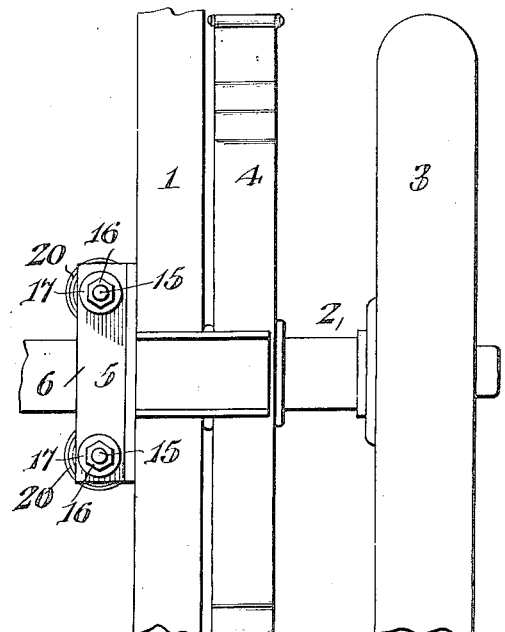
WITNESSES
Jas. H. McCathran
F. T. Chapman
A. O. Brock, INVENTOR
BY E. G. Siggers
ATTORNEY

UNITED STATES PATENT OFFICE.

ALFRED OWEN BROCK, OF SANTA MARGARITA, CALIFORNIA.

SHOCK-ABSORBER.

1,151,858.   Specification of Letters Patent.   Patented Aug. 31, 1915.

Application filed February 14, 1914.   Serial No. 818,735.

*To all whom it may concern:*

Be it known that I, ALFRED O. BROCK, a citizen of the United States, residing at Santa Margarita, in the county of San Luis Obispo and State of California, have invented a new and useful Shock-Absorber, of which the following is a specification.

This invention has reference to improvements in shock absorbers designed principally for use on automobiles, although applicable to other vehicles, and its object is to provide a device for the purpose which in addition to its function of modifying and restricting rebound of the vehicle body, has the further function of being auxiliary to the main springs, so that the latter may be lighter than otherwise would be the case, and consequently more elastic.

In accordance with the present invention the device comprises two members to be connected to the vehicle frame and to the vehicle axle, respectively, and these two members are traversed by one or more bolts or rods, usually two, each surrounded by a spring lodged between the two members so as to in part support the weight of the body of the vehicle. The rods or bolts are made long enough to extend beyond both members and are there surrounded by springs constituting the shock absorbing springs, and the arrangement is such that in the case of a rebound both of these springs are active to resist by compression the rebound of the vehicle body, and thereby absorb or modify any shocks which might otherwise be transmitted to the vehicle body.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation with parts in section of the shock absorber as applied to an automobile, the axle of the latter being shown in cross section. Fig. 2 is an edge elevation of the shock absorber with a part of the vehicle frame shown in cross section and only a fragmentary part of the vehicle illustrated. Fig. 3 is a top plan view of the structure shown in Figs. 1 and 2.

Referring to the drawings, there is shown a small portion of one of the side bars 1 of an automobile frame, together with an axle 2 which may be taken as the rear axle, a wheel 3 and a spring 4, the latter being one of the main springs of the vehicle. The structure so far described may be taken as typical of any automobile to which the invention is applicable.

The present invention includes an elongated bracket 5 shaped for attachment to the side member 1 and as this side member is illustrated in the drawings as of channel form, the bracket is shown as of double L shape with one web 6 outstanding from the member 1 toward the center line of the vehicle, but it will be understood that this bracket or other attaching member will vary in shape in accordance with the type of vehicle. In the particular showing of the drawings the bracket 5 is held to the channel member 1 by bolts 7. There is also provided the clip in the form of a yoke member 8 with oppositely outstanding ears 9 and a connecting strap 10 so arranged that the yoke member 8 may be secured in embracing relation to the axle 2. For other forms of axle the yoke member 8 and strap 10 will be appropriately constructed. To hold the yoke member in set position on the axle a set screw 11 is provided, and this may be made secure by a clamp nut 12 on the set screw.

The web 9 is formed with perforations 13, which, when the parts are in proper position, are in line with openings or perforations 14 through the ears 9. Extending through the perforations 13 and 14 are rods 15 which in the particular structure shown are in the form of bolts each with a nut 16 at one end, and washers 17, 18, respectively, are carried by the bolts, the washer 17 being lodged against the nut 16 and the washer 18 against the head of the bolt shown at 19.

Between the bracket web 6 and the ears 9 each bolt is surrounded by a spring 20 shown as a double conical coiled spring with the small ends remote one from the other and in respective engagement with the web 6 and ears 9. These springs serve to sustain in part the weight of the vehicle and vary in strength in accordance with the weight of the vehicle. The springs 20 relieve the springs 4 of an appropriate part of the load, so that the springs 4 may be made materially lighter than heretofore, and, therefore, more resilient, the combined action of the springs 4 and 20 serving to materially improve the ease of riding of the vehicle.

The bolts 15 are sufficiently long to project for a considerable distance beyond the web 6 in one direction and the ears 9 in the opposite direction, and these portions of the bolts are surrounded by coiled springs 21, 22, respectively, each spring engaging at one end the web 6 or an ear 9, as the case may be, and at the other end a washer 17 or 18 as the case may be. The springs 21 and 22 operate as equalizing springs maintaining the bolts or rods 15 in centralized position with respect to the parts through which they pass, and the perforations or passages 13 and 14 are sufficiently large to permit the bolts to pass therethrough without interference, and may be sufficiently large to permit moderate lengthwise or sidewise movements of the body without cramping of the bolts in these passages. It will be observed that the bolts 15 are not fastened at all to either the vehicle body or the axle, but tend to at all times maintain a floating relation to both the axle and the vehicle frame because of the equalizing action of the springs 21 and 22.

If the vehicle be subjected to a shock or to a weight tending to collapse the springs 4, the springs 20 are similarly affected and are compressed correspondingly. On the rebound of the vehicle body after being subjected to a shock compressing the springs 4 and 20 violently, such movement is only augmented by the expansive action of the springs 4 and 20. However, any tendency of the web 6 and ears 9 to separate is resisted by both springs 21 and 22 simultaneously, for all separating movements of these parts tend to compress both springs and consequently the rebound is rapidly checked and overcome without such violent and extensive movements as would occur under the same circumstances were the springs 21 and 22 absent. The bolts or rods 15 with the springs 21 and 22 operate as floating stops of progressively increasing resistance to any relative movements of the vehicle frame and axles tending to separate them.

The bolts 15 serve not only as retainers for the springs 20, but also for the springs 21 and 22 and are not fixedly connected to any part of the structure, but are always free to move through either the web 6 or the ears 9. Any rocking movement of the vehicle is resisted either by the springs 20 or the springs 21 and 22.

What is claimed is:—

1. A shock absorber for vehicles, comprising a bracket adapted to be secured to the body portion of the vehicle, a clip adapted to be secured to the axle of the vehicle and of a length to extend to opposite sides of said axle, the bracket being of a length corresponding to that of the clip, two floating bolts extending through the bracket and clip and located on opposite sides of the portion of the clip to engage the axle, a spring on each bolt between the bracket and clip, and other springs on the ends of each bolt on opposite sides of the bracket and clip from those engaged by the first-named spring, the bolts being wholly free from support either longitudinally or laterally other than that afforded by those springs engaging the heads and nuts, respectively, of said bolts, and the passages provided for the bolts through the bracket and clip being each of a size to permit the floating movements of the bolts.

2. A shock absorber for vehicles, comprising means adapted to be attached to the body frame of the vehicle, means adapted to be attached to the running gear of the vehicle below the first-named means, floating bolts extending through both means with the passages for the bolts of a size to permit free lateral and longitudinal movements of the bolts, springs around the bolts between said means, and other springs around the bolts on the sides of both means remote from those sides thereof engaged by the first-named springs.

3. The combination with a vehicle having a body frame, an axle, and a body supporting spring between the frame and axle, of a supplemental spring structure comprising a bracket attached to one of the side members of the body frame, a clip fastened to the axle of the vehicle and of a length to extend to opposite sides of said axle, and said bracket and clip having alined passages therethrough on opposite sides of the axle, upright bolts extending through the passages, and the latter being of a size with relation to the bolts to permit free lateral movements of the bolts in all directions and free longitudinal movements of the bolts, a double conical spring surrounding each bolt between the bracket and clip, and other springs surrounding each bolt between the heads and nuts, respectively, of the latter, and those faces of the bracket and clip remote from the faces engaged by the double conical spring, the bolts with the springs surrounding them being spaced apart in the direction of the length of the vehicle.

In testimony that I claim the foregoing as my own, I have hereto affixed my signature in the presence of two witnesses.

ALFRED OWEN BROCK.

Witnesses:
J. W. SMITH,
B. W. PENNINGTON.